(12) United States Patent
Zhang

(10) Patent No.: US 9,201,664 B2
(45) Date of Patent: Dec. 1, 2015

(54) METHOD FOR USERS TO GIVE COMMANDS DIRECTLY IN COMPUTER SOFTWARE

(76) Inventor: Xuezhi Zhang, Guangzhou (CN)

(*) Notice: Subject to any disclaimer, the term of this patent is extended or adjusted under 35 U.S.C. 154(b) by 222 days.

(21) Appl. No.: 12/769,621

(22) Filed: Apr. 28, 2010

(65) Prior Publication Data

US 2010/0287499 A1  Nov. 11, 2010

(30) Foreign Application Priority Data

May 7, 2009  (CN) .......................... 2009 1 0039269

(51) Int. Cl.
*G06F 17/00* (2006.01)
*G06F 9/44* (2006.01)

(52) U.S. Cl.
CPC .................... *G06F 9/4443* (2013.01)

(58) Field of Classification Search
CPC .............. G06F 17/271; G06F 9/4443
See application file for complete search history.

(56) References Cited

U.S. PATENT DOCUMENTS

| 4,435,752 | A  | * | 3/1984  | Winkelman |
| 6,580,838 | B2 | * | 6/2003  | Oliver et al. ................. 382/313 |
| 7,149,983 | B1 | * | 12/2006 | Robertson et al. ............ 715/810 |
| 2002/0086719 | A1 | * | 7/2002  | Kedia et al. ................... 455/574 |
| 2002/0169824 | A1 | * | 11/2002 | Dettinger ....................... 709/203 |
| 2003/0120822 | A1 | * | 6/2003  | Langrind et al. .............. 709/251 |
| 2003/0135508 | A1 | * | 7/2003  | Chorafakis et al. ........... 707/100 |
| 2004/0046804 | A1 | * | 3/2004  | Chang ............................ 345/810 |
| 2005/0005002 | A1 | * | 1/2005  | Bodin et al. ................... 709/223 |
| 2006/0261940 | A1 | * | 11/2006 | Defant et al. ............. 340/539.13 |
| 2007/0214122 | A1 | * | 9/2007  | Bala ................................ 707/3 |
| 2008/0134161 | A1 | * | 6/2008  | Chamieh et al. .............. 717/166 |
| 2009/0292375 | A1 | * | 11/2009 | Thompson et al. ............. 700/81 |
| 2010/0004924 | A1 | * | 1/2010  | Paez ................................. 704/9 |
| 2010/0241645 | A1 | * | 9/2010  | Kandogan et al. ............ 707/763 |

* cited by examiner

*Primary Examiner* — Tarek Chbouki

(57) ABSTRACT

A method for users to give commands directly in computer software, is involved with the user interface for software in computers and computing systems.

The present invention put forth a method for users to give commands directly in computer software through use of a command input module, a command dictionary or database with synonyms, a user command dictionary or database, a command search engine and a dynamical command execution module. The command search engine gets the command input from the command input module and searches the command dictionary or database and the user command dictionary or database, if a matching command with the command input is found, the dynamical command execution module is called to execute the command directly; if one or more synonymous or similar commands are found, a dynamical user interface with all the found commands is displayed for the user to select and execute; if no matching commands or synonymous commands are found, a message stating that the command input cannot be found in the software is displayed to the user. The present invention simplifies the use of software and greatly augments the ease of use of computer software.

20 Claims, 2 Drawing Sheets

METHOD FOR USERS TO GIVE COMMANDS DIRECTLY IN COMPUTER SOFTWARE

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is related to the user interface for software in computers and computing systems.

Software for computers and other electronic appliances is often delivered in non-transitory and tangible computer readable storage media such as hard disks, CDs, DVDs, ROM and flash memory etc. Commands are compiled beforehand and placed in command graphical interfaces such as menus, toolbars, dialog boxes and property sheets etc. in modern software with a graphical user interface. Users know what functionality a software has or what commands a software can execute only after they have some knowledge or understanding of the software. Users can execute a certain command only after they know a software has the command and where in the user interface the command is situated. Some commands in complicated software are placed inside a complex hierarchy of pull-down sub-menus inside parent menus. These commands are very difficult to find and very cumbersome to execute. This increases greatly the difficulty in the use of software. The present invention provides a method for users to execute commands directly in software, greatly increasing the ease of use for software.

BRIEF SUMMARY OF THE INVENTION

The present invention is a method for users to execute commands directly in software through a command input module, a command dictionary or database with synonyms, an user command dictionary or database, a command search engine and a dynamical command execution module. The command input module takes user input of commands and passes them to the command search engine and the command search engine searches the command dictionary and the user command dictionary for the command input. The command is executed directly by the command execution module if a matching command is found, several commands are presented to users for selection and execution with a dynamical user interface if one or several synonymous or similar commands are found or a message stating that matching or similar commands cannot be found in the software is displayed if no matching or synonymous commands are found.

DETAILED DESCRIPTION OF THE INVENTION

Figure 1:
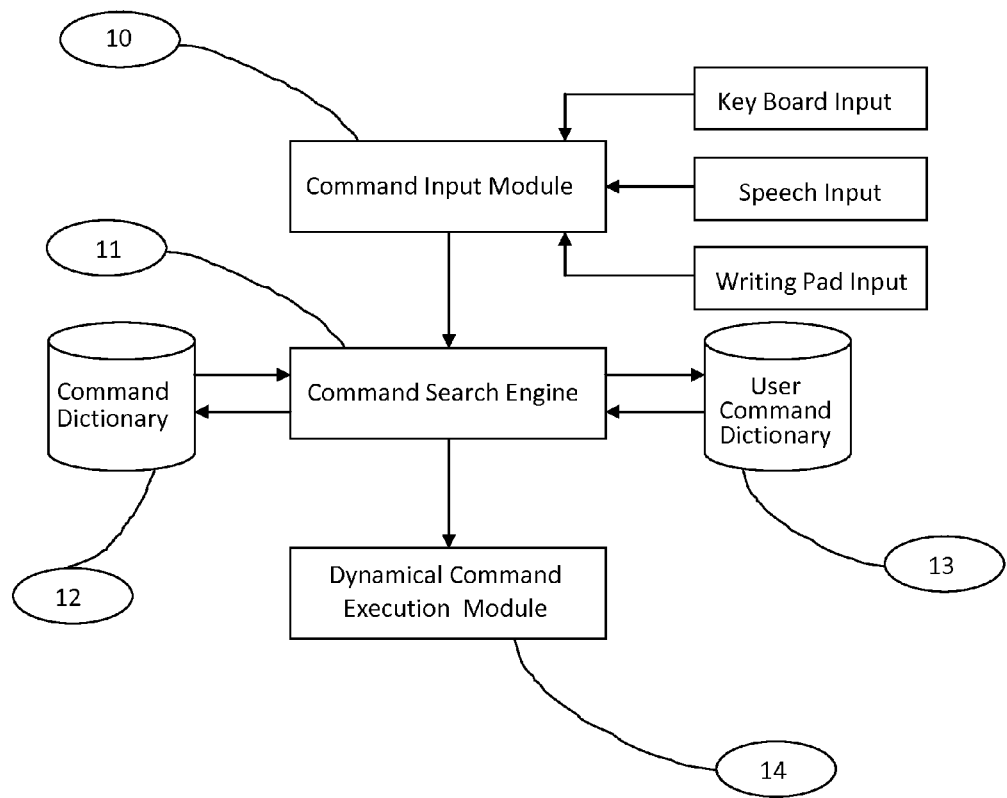
FIG. 1 is the block diagram for the present invention.

FIG. 1 shows the block diagram for the present invention. It is comprised of a command input module(10), a command search engine(11), a command dictionary or database(12), an user command dictionary or database(13) and a dynamical command execution module(14). The command input module(10) takes command input from the user. Commands can be input by the user from the keyboard, from speech through a speech identification system or from a writing pad or screen. After command input is taken by the command input module (10) and passed to the command search engine(11), the command search engine(11) searches the command dictionary or database(12) and the user command dictionary or database (13) for the command input. The command dictionaries or databases can be stored in memory media such as hard disc, flash memory or the RAM memory. The user command dictionary or database can also be stored in the computer registry. The command dictionary(12) stores all the command words, phrases and their short description phrases in the software and the synonyms and synonymous phrases of the command words and phrases. The command words and phrases are classified as "Commands" and their synonyms and synonymous phrases are classified as "Synonyms". Every command and its synonyms have an unique identification number (ID). This ID is used to call the dynamical command execution module(14) to execute the command. The user command dictionary or database(13) stores all the command inputs previously executed by all users and their corresponding executed commands. They also correspond to the unique IDs of the executed commands. The command search engine(11) first searches the "Commands" in the command dictionary (12) for the matching command with the command input, if a matching command is found, the dynamical command execution module(14) is called to execute the found command; if no matching command is found, it searches the command inputs in the user command dictionary or database, if a matching command input is found and the command input corresponds to one and only one command, the dynamical command execution module(14) is called to execute the correspondent command, if the matching command input corresponds to several commands, a dynamical user interface such as a dynamical dialog box is displayed with all the correspondent commands for the user to select and execute; if matching command or commands are still not found, the command search engine(11) searches the "Synonyms" in the command dictionary or database(12), if one or more "Synonyms" for the command input are found, a dynamical user interface such as a dynamical dialog box is displayed with all the commands corresponding to the found "Synonyms" for the user to select and execute, if the user select one of the commands to execute, the dynamical command execution module (14) is called to execute the selected command and the correspondence between the selected command and the command input is registered and saved in the user command dictionary or database(13) if it is not already there; if no any matching "Synonyms" for the command input are found, a message stating that matching command with the command input cannot be found in the software and asking the user to re-enter command inputs is displayed. The dynamical command execution module(14) is a global function for command execution, it executes commands according to the command ID passed to it by the caller.

The technical scheme described above is the preferred technical scheme for the present invention, but the present invention also covers variations of the above technical scheme, in accordance with the creative thoughts of the present invention, for example, changing the search sequence of the command search engine in searching the command dictionary and the user command dictionary; storing the previous command inputs with corresponding executed commands for a specific user in a user specific command dictionary and only searching the user's own personal command dictionary for matching command inputs; letting one command input to correspond to only one most recently executed matching command in the user command dictionary or setting up a general synonyms dictionary for command inputs, first finding the matching synonyms for the command input in the synonym dictionary and then searching for the command input and its synonyms in the command dictionary and the user command dictionary, in which case the command dictionary only needs to collect all the command words, phrases and their short description phrases in the software. These variations of the technical scheme can also let users give command directly in computer software. The technical scheme described above in the previous paragraph presents the preferred technical scheme for the present invention. It uses only the synonyms and synonymous phrases of the commands in the software, without the need to set up a vast general synonym database for command inputs as in one of the variations described above. This decreases searching time and speeds up program execution.

The present invention can be employed in any general purpose or special purpose computing environments or computing systems. Examples of applicable known computing systems, computing environments and/or computing configurations for the present invention include, but not limited to, personal computer, server computer, portable or laptop equipment, multiple processor systems, systems based on micro-processors, set top box, programmable consumer electronic appliances, network personal computers, small computers, large scale computers and distributed computing environments which contain any systems and/or equipments described above, etc.

The present invention makes use of the command search engine, command dictionary with synonyms, user command dictionary and dynamical command execution module to let users execute commands directly in computer software thus increasing greatly the ease of use for computer software.

DETAILED EMBODIMENT

Figure 2:
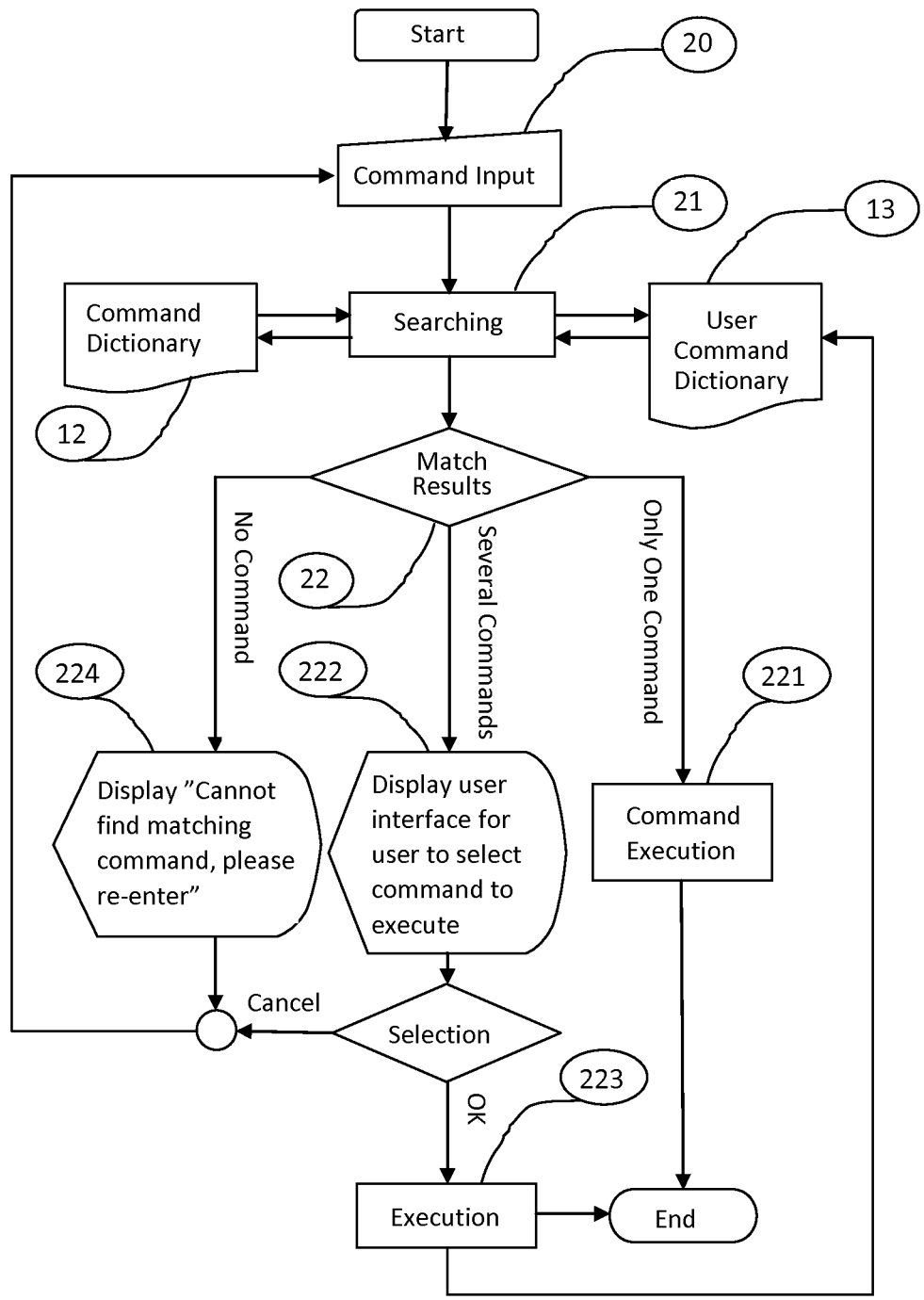
FIG. 2 is the flow chart for the technical scheme for the preferred embodiment of the present invention.

Further description of the present invention is made in the following section with a preferred embodiment and the figures. FIG. 1 is the block diagram for the present invention. FIG. 2 is the flow chart for the technical scheme for the preferred embodiment of the present invention. The detailed steps are described further below.

Step 20: User Command Input can be realized with a Command Text Input edit box in the current embodiment on the toolbar.

Step 21 and Step 22: Command Search and Execution can be started by a click on an "Execution" button on the right hand side of the Command Text Input edit box in the current embodiment. Once the "Execution" button is clicked, the command input module(10) takes the command input from the Command Text Input edit box and passes it to the command search engine(11). The command search engine(11) then searches the command words and/or phrases in the command dictionary(12) and turns to Step 221 to call the dynamical command execution module(14) to execute the command if a matching command is found; if no matching command is found, it searches the command inputs stored in the user command dictionary(13) and turns to Step 221 to call the dynamical command execution module(14) to execute the correspondent command if the same command input is found and it corresponds to one and only one command or turns to Step 222 to display a dynamical user interface with all the correspondent commands for the user to select and execute if the matching command input corresponds to more than one command in the user command dictionary(13); if no matching command input is found in the user command dictionary(13), the command search engine(11) continues to search the synonyms and synonymous phrases in the command dictionary(12) and turns to Step 222 to display a dynamical user interface with all the commands which correspond to the matching synonyms or synonymous phrases for the user to select and execute and saves the correspondence between the command selected and executed with the command input to the user command dictionary(13) if the correspondence pair of command input and executed command is not already registered in the user command dictionary(13); if no matching synonyms or synonymous phrases are found, it turns to Step 224 to display the following or similar message: "No matching commands are found with your command input, please enter similar or other commands."

Step 222: When search result contains several matching commands, a dynamical user interface with all the matching commands is displayed to the user, this dynamical user interface can be a dynamical dialog box with command buttons for all the matching commands and a "Cancel" button in the current embodiment; if the user clicks on one of the command buttons, the program turns to Step 223 to call the dynamical command execution module(14) to execute the correspondent command, the correspondence pair of the executed command and the command input is saved to the user command dictionary(13) if it is not already there; if the user clicks on the "Cancel" button, the current command input is cancelled and the program waits for other command input.

The dynamical dialog box mentioned above in Step 222 for the current embodiment can be realized in the way described below. The dynamical dialog box contains several, say 10, command buttons and a "Cancel" button. When constructing the dynamical dialog box, the matching commands as a string array and their correspondent command IDs as an integer array are passed to the class constructor of the dynamical dialog box to replace the displaying names of the command buttons and their correspondent command IDs, respectively. When the dynamical dialog box is initialized and displayed, the extra command buttons are deactivated, i.e. "grayed", according to the number of matching commands, other command buttons correspond to the matching commands one to one with the names of the correspondent matching commands and their command IDs. When one of these command buttons is clicked, the handling program takes the correspondent command ID and passes it to the dynamical command execution module(14) to execute the command.

In the current embodiment, the dynamical command execution module(14) can be a global function that executes commands according to their unique command IDs. The following is one pseudo-code for implementing the global function.

```
CommandExecFunc(ID)
{
    Switch (ID)
    {
    Case (N1):
        Execute Command C1;
    Case (N2):
        Execute Command C2;
    Case (N3):
        Execute Command C3;
    .
    .
    .
    Case (NN):
        Execute Command CN;
    }
}
```

The above embodiment is an example provided for general technicians in the field to realize the present invention. Technicians in the field can make changes or modifications to the embodiment described above in accordance with the creative thoughts of the present invention. Therefore the scope of the present invention will not be limited by the above embodiment, but will be extended to the maximum extent in accordance with the creative characteristics put forward in the claims section.

The invention claimed is:

1. A method for users to give commands directly in computer software to be used in computers and other programmable devices to render them easier to use, the method comprising:

receiving a command in text form from a user input interface;

searching first for matches the command words and phrases in the command database, which contains command words and phrases in the software as well as synonyms and synonymous phrases to the command words and phrases;

determining if a match for the command is found and the matched command is executed;

if no match is found, then searching for matches the recorded previous user command inputs in the user command dictionary or database, if a match with previous user command inputs is found, for cases of only one previously executed command corresponding to the matched user command input, the previously executed command is executed, for cases of multiple previously executed commands corresponding to the matched user command input, the previously executed commands are presented with a dynamical user interface for the user to select and execute; wherein the dynamical user interface associates said matched commands with user interface elements through command names or command identifiers dynamically by passing the command name strings and command identifiers to the constructor of the dynamical user interface to replace the displaying names and the command identifiers of the user interface elements;

if no match with previous user command inputs is found, finally searching for matches the synonyms and synonymous phrases in the command database, if one or more matches are found, the command or commands corresponding to the match or matches are presented with a dynamical user interface for the user to select and execute, the selection by the user is recorded in the user command database or dictionary; and if a match is still not found, a message stating that the input command cannot be found in the software is displayed to the user.

2. The method of claim 1, wherein each command word or command phrase in the command database has a unique command ID, command synonyms or synonymous phrases correspond to the command IDs of their synonymous commands.

3. The method of claim 1, wherein a user command dictionary or database is used to record previous command inputs and their correspondent executed commands to be employed in later command search and execution, the user command dictionary or database can be a combined dictionary or database for all users or a series of user specific dictionaries.

4. The method of claim 1, wherein the correspondence between the command input and the executed commands in the user command dictionary or database can be one to one or one to multiple correspondence; the correspondence of the command input with executed command is saved to the user command dictionary or database when users select a command to execute for their command input to replace the existing correspondence for the command input for an one to one correspondence user command dictionary or database or to add to the existing correspondences if the current correspondence is not already there for an one to multiple correspondence user command dictionary or database.

5. The method of claim 1, wherein the dynamical user interface includes a dynamical dialog box which associates said matched commands or command synonyms as string array and their corresponding command identifiers as an integer array with command buttons for the matched commands or matched command synonyms for users to select and execute.

6. The method of claim 1, wherein the command execution includes execution through a global function that uses command IDs to execute commands in the software.

7. The method of claim 1, wherein the command searching sequence can be changed; command searching can start from the previous user command inputs in the user command database or dictionary, then go through the command words and phrases in the command database and finally go through the command synonyms and synonymous phrases in the command database.

8. The method of claim 1, wherein the user input interface includes a keyboard for entering commands.

9. The method of claim 1, wherein the user input interface includes voice input and recognition systems for inputting voice commands.

10. The method of claim 1, wherein the user input interface includes writing pads or screens for entering commands.

11. A non-transitory and tangible computer readable storage medium having stored thereon instructions to cause a computer or other programmable devices to execute a method, the method comprising:

receiving a command in text form from a user input interface;

searching first for matches the command words and phrases in the command database, which contains command words and phrases in the software as well as synonyms and synonymous phrases to the command words and phrases;

determining if a match for the command is found and the matched command is executed;

if no match is found, then searching for matches the recorded previous user command inputs in the user command dictionary or database, if a match with previous user command inputs is found, for cases of only one previously executed command corresponding to the matched previous user command input, the previously executed command is executed, for cases of multiple previously executed commands corresponding to the matched user command input, the previously executed commands are presented with a dynamical user interface for the user to select and execute; wherein the dynamical user interface associates said matched commands with user interface elements through command names or command identifiers dynamically by passing the command name strings and command identifiers to the constructor of the dynamical user interface to replace the displaying names and the command identifiers of the user interface elements;

if no match with previous user command inputs is found, finally searching for matches the synonyms and synonymous phrases in the command database, if one or more matches are found, the command or commands corresponding to the match or matches are presented with a dynamical user interface for the user to select and execute, the selection by the user is recorded in the user command database or dictionary; and if a match is still not found, a message stating that the input command cannot be found in the software is displayed to the user.

12. The computer readable storage medium of claim 11, wherein each command word or command phrase in the command database has an unique command ID, command synonyms or synonymous phrases correspond to the command IDs of their synonymous commands.

13. The computer readable storage medium of claim 11, wherein a user command dictionary or database is used to record previous command inputs and their correspondent executed commands to be employed in later command search and execution, the user command dictionary or database can be a combined dictionary or database for all users or a series of user specific dictionaries.

14. The computer readable storage medium of claim 11, wherein the correspondence between the command input and the executed commands in the user command dictionary or database can be one to one or one to multiple correspondence; the correspondence of the command input with executed command is saved to the user command dictionary or database when users select a command to execute for their command input to replace the existing correspondence for the command input for an one to one correspondence user command dictionary or database or to add to the existing correspondences if the current correspondence is not already there for an one to multiple correspondence user command dictionary or database.

15. The computer readable storage medium of claim 11, wherein the dynamical user interface includes a dynamical dialog box which associates said matched commands or command synonyms as string array and their corresponding command identifiers as an integer array with command buttons for the matched commands or matched command synonyms for users to select and execute.

16. The computer readable storage medium of claim 11, wherein the command execution includes execution through a global function that uses command IDs to execute commands in the software.

17. The computer readable storage medium of claim 11, wherein the command searching sequence can be changed; command searching can start from the previous user command inputs in the user command database or dictionary, then go through the command words and phrases in the command database and finally go through the command synonyms and synonymous phrases in the command database.

18. The computer readable storage medium of claim 11, wherein the user input interface includes a keyboard for entering commands.

19. The computer readable storage medium of claim 11, wherein the user input interface includes voice input and recognition systems for inputting voice commands.

20. The computer readable storage medium of claim 11, wherein the user input interface includes writing pads or screens for entering commands.

\* \* \* \* \*